(12) United States Patent
Nagarajan et al.

(10) Patent No.: US 9,692,788 B2
(45) Date of Patent: Jun. 27, 2017

(54) METHOD AND SYSTEM FOR DOMAIN CREATION AND BOOTSTRAPPING

(71) Applicants: BlackBerry Limited, Waterloo (CA); 2236008 Ontario Inc., Waterloo (CA)

(72) Inventors: Sivakumar Nagarajan, Ottawa (CA); Daniel Jonas Major, Ottawa (CA); Calin Marius Bozsitz, Waterloo (CA); Srdan Dikic, Waterloo (CA)

(73) Assignees: BlackBerry Limited, Waterloo, CA (US); 2236008 Ontario Inc., Waterloo, CA (US)

( * ) Notice: Subject to any disclaimer, the term of this patent is extended or adjusted under 35 U.S.C. 154(b) by 99 days.

(21) Appl. No.: 14/290,184

(22) Filed: May 29, 2014

(65) Prior Publication Data

US 2015/0350248 A1    Dec. 3, 2015

(51) Int. Cl.
*H04L 29/06* (2006.01)
*H04W 12/10* (2009.01)
*G06F 21/60* (2013.01)
*H04W 4/00* (2009.01)
*H04W 12/08* (2009.01)
*G06F 21/53* (2013.01)
*G06F 9/455* (2006.01)

(52) U.S. Cl.
CPC .......... *H04L 63/20* (2013.01); *G06F 9/45558* (2013.01); *G06F 21/53* (2013.01); *G06F 21/604* (2013.01); *H04L 63/10* (2013.01); *H04W 4/001* (2013.01); *H04W 12/08* (2013.01); *H04W 12/10* (2013.01); *G06F 2009/45587* (2013.01); *G06F 2221/2149* (2013.01)

(58) Field of Classification Search
CPC ........ H04L 63/20; H04L 63/10; H04W 12/10; H04W 12/08; H04W 4/001; G06F 9/45558; G06F 21/53; G06F 21/604; G06F 2221/2149; G06F 2009/45587; H06G 9/45558
See application file for complete search history.

(56) References Cited

U.S. PATENT DOCUMENTS 8,418,230 B1 *  4/2013  Cornelius ............... G06F 15/80
                                                        712/1
8,863,252 B1 * 10/2014  Katzer .................... G06F 21/53
                                                       705/71

(Continued)

FOREIGN PATENT DOCUMENTS

EP         2584753 A1      4/2013

OTHER PUBLICATIONS

European Patent Office, Extended European Search Report on Application No. 15169856.0, Issued on Oct. 8, 2015.

(Continued)

*Primary Examiner* — Joseph P Hirl
*Assistant Examiner* — J. Brant Murphy
(74) *Attorney, Agent, or Firm* — Moffat & Co.

(57) ABSTRACT

A method at a mobile device for creating a managed domain on the mobile device, the method initializing a container on the mobile device to house the managed domain; retrieving, from the mobile device, a management agent for the management domain; establishing policies to govern the creation of the managed domain; and configuring the container for the domain based on the established policies.

16 Claims, 6 Drawing Sheets

(56) References Cited

U.S. PATENT DOCUMENTS

| | | | |
|---|---|---|---|
| 8,984,592 B1* | 3/2015 | Paczkowski | H04W 12/08 726/26 |
| 9,043,460 B1* | 5/2015 | Kim | H04L 29/06 370/352 |
| 9,380,456 B1* | 6/2016 | Lee | H04W 12/08 |
| 2005/0213763 A1* | 9/2005 | Owen | H04L 63/0442 380/270 |
| 2008/0134176 A1 | 6/2008 | Fitzgerald et al. | |
| 2009/0049521 A1* | 2/2009 | Le Rouzic | G06Q 20/02 726/4 |
| 2010/0199325 A1* | 8/2010 | Raleigh | G06F 21/53 726/3 |
| 2012/0124640 A1* | 5/2012 | Bender | H04L 63/105 726/1 |
| 2013/0097657 A1* | 4/2013 | Cardamore | H04W 12/08 726/1 |
| 2013/0122910 A1* | 5/2013 | Singh | H04W 36/18 455/437 |
| 2014/0007215 A1* | 1/2014 | Romano | H04L 63/0281 726/12 |
| 2014/0007222 A1* | 1/2014 | Qureshi | G06F 21/10 726/16 |
| 2014/0059525 A1 | 2/2014 | Jawa et al. | |
| 2014/0109176 A1 | 4/2014 | Barton et al. | |
| 2014/0109178 A1* | 4/2014 | Barton | G06F 9/45533 726/1 |
| 2014/0181894 A1* | 6/2014 | Von Bokern | H04L 63/061 726/1 |
| 2014/0297840 A1* | 10/2014 | Qureshi | G06F 21/41 709/224 |
| 2014/0330948 A1* | 11/2014 | Dunn | H04L 41/0813 709/221 |
| 2014/0380406 A1* | 12/2014 | Saidi | H04L 63/20 726/1 |
| 2015/0350105 A1* | 12/2015 | Nagarajan | H04L 47/80 709/225 |

OTHER PUBLICATIONS

European Patent Office, Office Action for Application No. 15169856.0, issued on Mar. 15, 2017.

* cited by examiner

METHOD AND SYSTEM FOR DOMAIN CREATION AND BOOTSTRAPPING

FIELD OF THE DISCLOSURE

The present disclosure relates to domain creation on a mobile device and in particular relates to the creation of managed domains on a mobile device.

BACKGROUND

Mobile devices are often deployed into an environment that requires management of the device. For example, a device may be managed to enforce policies such as security levels for password, encryption of data, use of certain features on the device, among other options for management. In some cases the management is for the entire device and in some cases the management is just for a portion of the device.

The purpose of management of the device is to control the use of the device and to ensure that the way a device, or at least a part of the device that operates within the management restrictions, complies with policies stipulated by the relevant management authorities.

A device may have a plurality of domains, which are distinct areas on the device and may have their own virtualized operating system. A domain may be the part of the device being controlled and a device may operate with at least one domain and zero or more domain authorities that control the domain.

A user who wishes to monitor or control the device or a user that wishes to restrict or protect its own device may configure a domain authority on the device. In some cases the user may wish to enroll/authenticate a device with an enterprise/enterprise network, and in order to do this, the enterprise needs to provision a management authority onto the device. To do this, the device may have a mechanism to deploy a trusted domain authority onto a device. Such device may potentially already have other domains that are already managed by domain authorities.

BRIEF DESCRIPTION OF THE DRAWINGS

The present disclosure will be better understood with reference to the drawings, in which.

DETAILED DESCRIPTION OF THE DRAWINGS

Figure 1:
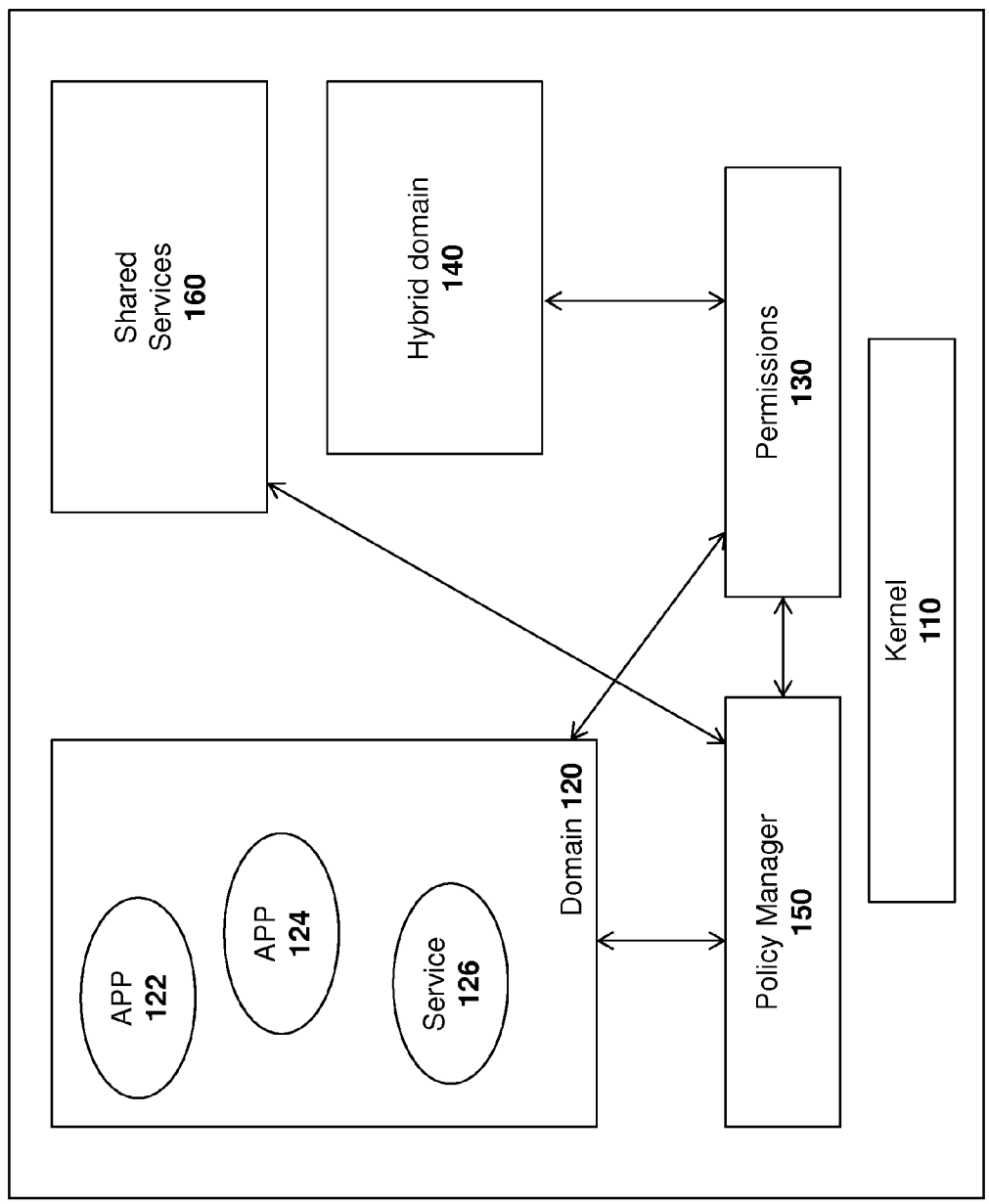
FIG. 1 is a block diagram illustrating logical components on a mobile device for administering multiple management agents in accordance with one embodiment of the present disclosure.

The present disclosure provides a method at a mobile device for creating a managed domain on the mobile device, the method comprising: initializing a container on the mobile device to house the managed domain; retrieving, from the mobile device, a management agent for the management domain; establishing policies to govern the creation of the managed domain; and configuring the container for the domain based on the established policies.

The present disclosure further provides a mobile device configured for creating a managed domain on the mobile device, the mobile device comprising: a processor; and memory, wherein the mobile device is configured to: initialize a container on the mobile device to house the managed domain; retrieve, from the mobile device, a management agent for the management domain; run the management agent on the mobile device; establish policies to govern the creation of the managed domain; and configure the container for the domain based on the established policies.

Management agents, also referred to as mobile device management (MDM) agents, can be used to manage some or all aspects of the use of a device. A management agent, as used herein, is an entity on a device which may receive and enforce policy decisions, for example from an external management authority. The management agent is one endpoint of the management authority and may act as a proxy for the management authority on the device. For example, an enterprise may wish to enforce a corporate policy on devices of employees. As such, the enterprise may have a server acting as a management authority that allows administrators to set and push policies to devices. The devices have a management agent to receive and implement such policies. In some cases, the user of a mobile device may also be considered to be a management authority. Such management agents may need to be provisioned or installed on a computing device at different points in time. For example, the management agent may be preconfigured on a device at the time the device is shipped, or may be configured by an enterprise before issuing the device to an employee, or may be added by an enterprise on an employee's own device prior to allowing the device to be used to receive work email or data, or may be added to a device by a parent prior to allowing a child to use the device, among other possibilities.

The management software that manages the device can be provided for example, by a device vendor or a third party, including for example an enterprise that manages or deploys the device, or in some cases admit a device purchased or brought by one of its employees into its network for management.

In some embodiments, a single user device may include multiple domains or perimeters that logically separate computer resources (e.g., applications, data, network access, configuration files) such that a domain may be prevented from accessing resources included in a different domain. For example, the domains may prevent personal resources in one domain may be prevented from accessing corporate resources in another domain or vice-versa. Keeping corporate data, applications, and networks isolated from personal data, applications, and networks is desirable because a user can use a single device to separately access the different groups of resources. In other words, an enterprise may extend a secured domain on a single user device without interfering with the user's personal experience on the same device. In some embodiments, the device may also comprise a hybrid domain that allows access to data in the other domains as needed. This hybrid domain may, for example, be used to show unified inbox applications that shows e-mail messages from all of the domains. In other embodiments, different types and numbers of domains could be included on the device.

Further, a device may have multiple functional groups of domains on the device. For example, a device may have a personal domain and a work domain, a parent domain and a child domain, a personal domain as well as a domain for various consultants, among other options. In such an environment, management authorities may wish to contain various functionality within the group and also restrict the access to each group. As used herein, a domain may be a separate area in the software on a mobile device, and in some cases may be an area running its own virtualized operating system on the mobile device hardware.

As indicated above, a user who wishes to monitor or control the device or restrict or protect the device may configure a domain with a management authority by configuring a management agent for the domain on the device. Such configuration needs a mechanism to deploy a trusted management agent onto the device in a way that allows first, the management authority to trust the initial state of the domain it is going to manage, and second that an existing device or domains on the device are able to trust the new management authority that is being deployed.

The present disclosure provides for a trusted mechanism for creating a new domain on an existing device and an installation of a domain management authority on to the device either in the domain or into another portion of the device.

Further, depending on the mode in which the device is going to be used and the mode in which the device needs to be managed, the enterprise deploying the device management may need control of the creation and bootstrapping of the domain on the device.

Typically, the process of taking a device and adding a domain management agent on to the device is called activation. Since the device can have multiple domains, it may need to be activated multiple times. Similarly, an activation agent may wish to stop managing the device and needs to be able to delete the domain that was being managed.

The device further may need to be able to delete the agent that was managing the device and the domain being managed, both in a secure manner so that data in that domain is no longer accessible on the device. The deletion typically also needs to proceed in a trustworthy manner so that no data from the domain being removed remains on the device.

An example of a typical device structure for use with the embodiments of the present disclosure is provided with regard to FIG. 1. As seen in FIG. 1, a device may include various logical components as part of the operation of such device. In particular, a device may have an operating system which includes a kernel 110 on which the software of the device runs.

In the example of FIG. 1, a single domain 120 exists on the device. However, this is merely meant for illustrative purposes and in accordance with the present disclosure multiple domains could exist on a device. Domain 120 includes various software and services. In particular, in the embodiment of FIG. 1, application 122 and application 124 are provided within the domain 120. Further, services, which may provide functionality for applications and run in the background, are included within domain 120 and are shown as services 126.

A permissions engine 130 is used to control device permissions and allow certain functionality and operation of the device. For example, device permissions may allow access to certain hardware or software on the device, may require certain preconditions such as a password being entered prior to allowing access to data, among other options.

As seen in the embodiment of FIG. 1, domain 120 interacts with permissions engine 130 to determine what functions applications 122 or 124, or services 126 may complete, and determine if such applications or services are allowed to perform the operations that they are attempting.

Further, in the embodiment of FIG. 1, a hybrid domain 140 exists. Hybrid domain 140 is a special domain which may have access to the plurality of domains that are on the device. In the example of FIG. 1, since only domain 120 exists on the device, hybrid domain may have access to the data within the domain to provide for various functionalities such as a consolidated e-mail application, among other options. The hybrid domain may also be referred to as a system domain.

A policy manager 150 may be used on a device to administer multiple management authorities (agents). Policy manager 150 provides a mechanism for regulating a hierarchy of management authorities. The management authorities in this hierarchy of authorities are ranked in order of the trust associated with a vendor providing the software for the management authorities when viewed by the policy manager 150.

Shared services 160 include any services that may be used by multiple domains. For example, a Wi-Fi chip may exist on the mobile device, where a plurality of domains may require access to the Wi-Fi chip. A policy may be to turn off Wi-Fi or to turn on Wi-Fi. Control of the shared services is directed by the policy manager 150 when it aggregates the policies of each of the MDM agents in each of the domains.

As indicated above, one issue with the creation of a new domain is that the new domain authority must trust the creation of the domain at the same time that existing domain management authorities trust the creation of the new domain. In order to accomplish this, an example process is provided with regard to FIG. 2.

Figure 2:
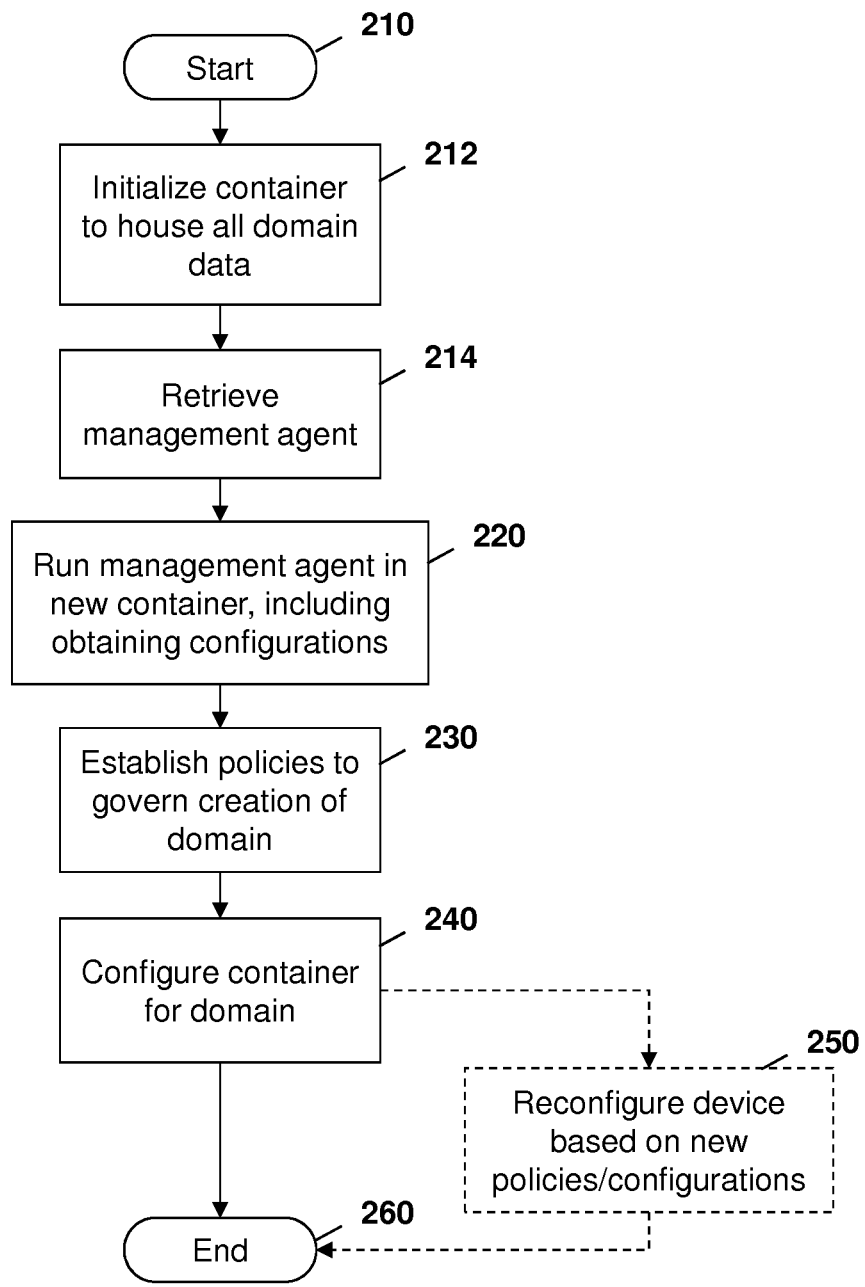
FIG. 2 is a flowchart showing the creation of a managed domain in accordance with one embodiment of the present disclosure.

FIG. 2 shows a flowchart for an example process to create a managed domain. In particular, the process starts at block 210 and proceeds to block 212 in which the mobile device initializes a container within the device that will house all domain data to be managed. A container as used herein is the memory area on the device that will house the domain. The initialization does not involve the creation of the complete domain but merely involves the starting of the creation of the domain in order to avoid the domain from being untrusted by a new domain authority.

From block 212 the process proceeds to block 214, in which the mobile device retrieves the software and policies of the management agent. Such retrieval may be either locally within the memory of the device or may be from an external source utilizing a communications subsystem on the mobile device. The retrieved management agent may then be used to configure the new domain. For example, the management agent may be used to ensure that a memory area of the domain is password encrypted and that the password meets a certain minimum threshold, that functionality within the domain, such as copying, pasting, printing, is enabled or disabled, among other possibilities.

The process then proceeds to block 220 in which the management agent is installed and run within the container for the domain that was just created or into a system area on the device. The management agent will potentially communicate with a remote endpoint for authentication and then download one or more configurations which will drive the remaining process of activation.

The process of FIG. 2 next proceeds to block 230 in which, based on the configurations downloaded in block 220, the management agent may need to establish policies that govern the creation of the domain to be managed. Such policies may include the encryption of data, requirements for passwords for authentication, control of access to specific services to various components within the domain, the deploying of applications, profiles or configurations to the domain, among other policies.

From block 230, the process proceeds to block 240 in which the platform then configures the container that the agent will be managing. In some cases, the agent may wish to manage just the domain that it is associated with. In other cases, the agent will manage the entire device. In the case that the agent is managing the entire device, the process of activation may involve reconfiguring the existing device to satisfy all of the policies and configurations of the device. Such reconfiguration is shown as the optional block 250.

The reconfiguration at block 250 may involve deleting of some or all existing data on the device, removal of existing applications or configurations on the device, and creation or initialization of at rest data storage regions with satisfactory encryption properties based on the new policies loaded.

In the case that the agent wishes to manage a new domain with a smaller limited amount of control over the rest of the device, the device platform software may create a new domain which meets the requirements of this configuration and may move the agent into the new domain just created. This controlled step maintains integrity of the device and the domain to be managed. For the cases where a device has multiple domains managed by multiple domain authorities, limiting the agent to specific controls within the new domain protects the remaining management functionality and authorities on the device from this new management authority.

From block 250 the process proceeds to block 260 and ends.

The management agent retrieved in block 212 above may be trusted, including MDM agents that are written or provided by a device manufacturer, shipped on the device, stored on trusted file systems that are not modifiable by the device or third parties, among others. As used herein, trusted indicates that a relationship exists between the policy manager and the source of the MDM agent, to allow the policy manager to be confident is not malicious.

The platform also may support MDM agents that are less trusted, including third party or downloaded applications that perform the task of management agents.

MDM agents should be allowed to exercise control of the domains in which they are implemented, but may, in some cases, also control more than just such domain. If allowed to exercise control outside of its domain, the MDM agent may be granted elevated privileges within the domain they are controlling, yet limited privileges outside such domain.

Further, as indicated above, the bootstrapping of the domain creation may require the agent to be present on the device before the domain the agent controls is present on the device. Operations that the agent performs may include the both the creation and the deletion of the domain. Deletion may need the domain to be systematically removed when the controlling agent, such as the authority for the domain, requests such deletion.

While FIG. 2 indicates that the management agent is running the new container, other possibilities exist. In particular, reference is now made to FIG. 3 which shows that an MDM agent may reside in a "system" domain outside of the new domain being created. In particular, as seen in FIG. 3, a device includes a platform 310 which may include the policy manager, permission manager, the operating system kernel, among other functionality.

A system domain 320, which may also be referred to in some embodiments as a "hybrid domain", includes the new MDM agent 322 which is downloaded or retrieved at block 212 of FIG. 2. Further, the new domain being created is shown by block 330 in the embodiment of FIG. 3.

In the case where the agent runs in the system domain, the agent may be part of device software as provisioned or shipped. Alternatively, the agent may be downloaded from a remote server, such as from a "cloud server", as part of enrollment for a service or domain. The agent may further be downloaded from an application store where descriptors within the application may identify the application as a domain management application.

Figure 3:
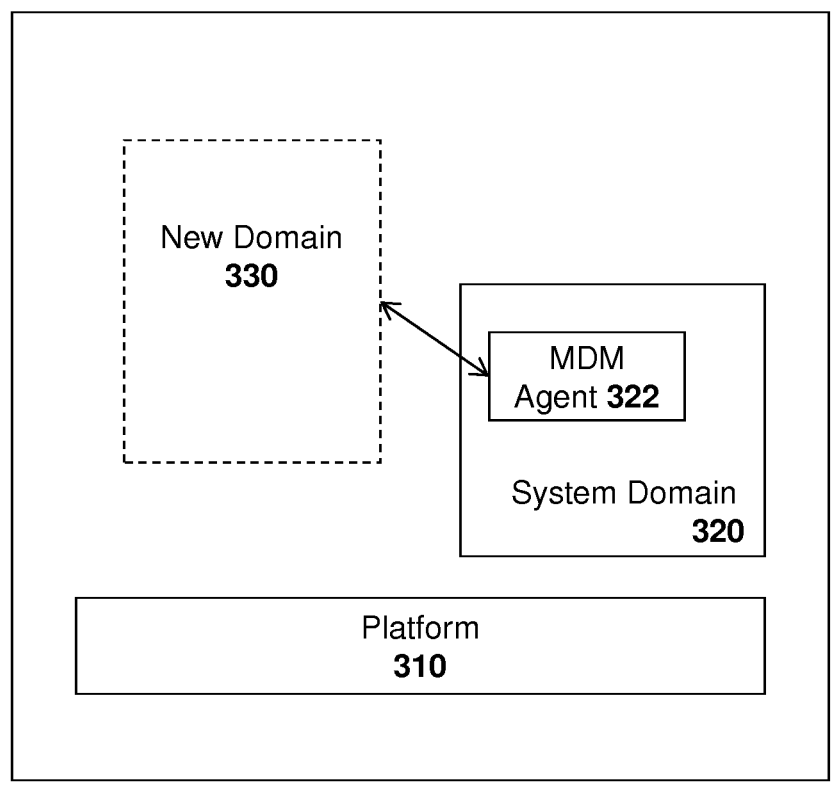
FIG. 3 is block diagram showing the creation of a new domain having a management agent within a system domain in accordance with one embodiment of the present disclosure.

The agent in the case of the embodiment of FIG. 3 may use platform application program interfaces (APIs) to create the domain, delete the domain and manage the domain. Specific security restrictions provided by the platform may restrict the agent from being able to perform operations on domains that it does not control.

Figure 4:
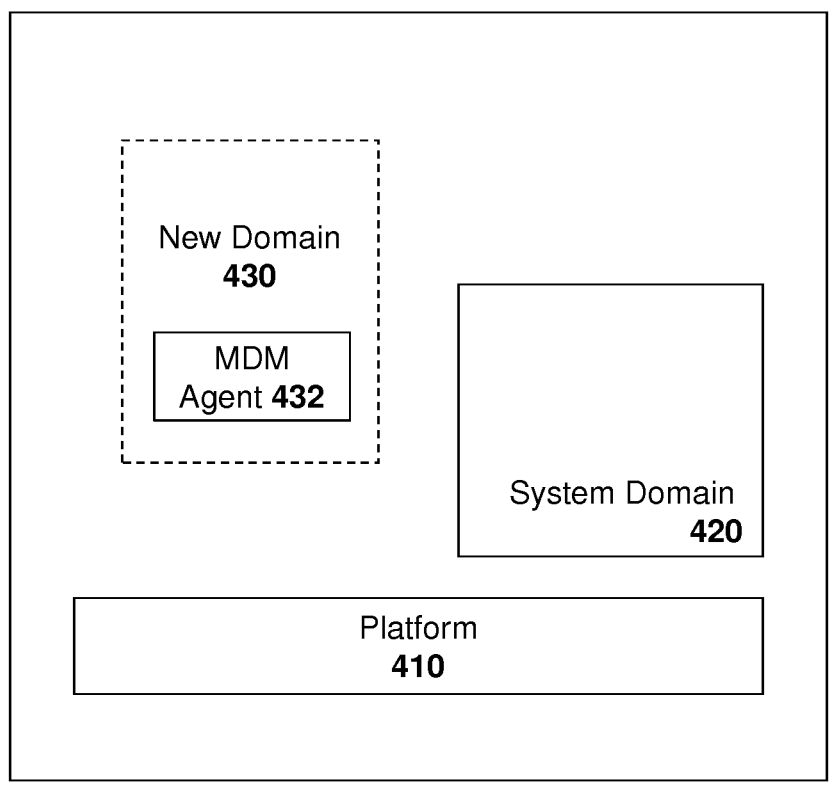
FIG. 4 is a block diagram showing the creation of a new domain having a management agent within a new domain in accordance with one embodiment of the present disclosure.

Alternatively, the MDM agent may run within the domain it manages. Reference is now made to FIG. 4. As seen in FIG. 4, platform 410 may include the policy manager, permissions block, kernel, among other functionalities.

A system domain 420 may be used for common functionality between various domains that exist on a computing device. Further, a new domain 430 is being configured in the example of FIG. 4.

The MDM agent 432 is added to the domain. In this case, the process of FIG. 2 may be utilized to add the MDM agent 432 to the domain. Again, the MDM agent may be included on the device by the device manufacturer, or downloaded from a remote server or application store.

With the embodiment of FIG. 4, the domain may be created as part of the initiation of the enrollment process and the agent is installed on the domain it is going to manage. The platform 410 identifies as part of the enrollment process that the agent to be run is associated with the domain that it is going to manage and thus the platform creates the domain, and installs the agent into the domain that it just created in accordance with FIG. 2.

Depending on whether the agent application is so designated, the application may either run immediately, in the context of the domain just created, or a user may be returned to a home screen of the computing device and can initiate a process from an icon of an installed agent which may be visible on such home screen.

If enrollment is from a settings application, the settings application may provide a way to invoke the process of domain creation with the specified agent.

Further, regardless of whether the embodiment of FIG. 3 or 4 are used, the agent itself may be categorized into one of at least two categories. In one case, the agent may be strictly configured to only manage the domain it is being deployed into or for. In an alternative case, the agent is configured to allow it to manage both the domain it is configured for, as well as either portions or the remainder of the device. Such management of the rest of the device includes pass through configurations and policies. For example, if a device has a work domain and a personal domain, only configured for the work domain fall into the first category above, a device MDM agent that is configured for the work domain and some device domains, referred to as regulated balance, will fall into the second category and management agent configured for the entire device is considered a "workspace only" agent and fall into the third category.

As indicated above, when a new agent is being installed it must meet the policies of the existing agents in the device. The existing policies may be prioritized either based on trust, configuration, or first agent installed depending on the situation. In these cases, the strictest configuration, or the first agent installed may be used for configuration of the device.

If an agent wants to configure only its own domain, such domain is created and configured by the agent and hence the agent will be the first agent in that domain and will receive priority in that domain. Conversely, if an agent wants to configure more than its own domain, it needs permissions to do so, including potentially from agents already controlling other domains that the new agent wants to make changes to, or in some cases other agents that control such domains may need to be disabled.

In other cases, a cooperative model between agents may require an aggregator such as policy manager 150 from FIG. 1 to aggregate the configurations and policies on the device. Such policy manager may ensure that the strictest of all restrictions is enforced on the device, and that as these restrictions are added or removed, the restrictions on the device are resolved and dynamically configured to be applied to the device.

Platform 310 or 410 may be used to provide APIs for domain management, including APIs for domain creation, deletion, or control of other domains. For domain creation, the APIs may be able to associate "an account" in an account manager to a specific domain, allowing deletion of an account to be simultaneously tied to the domain deletion as well.

Figure 5:
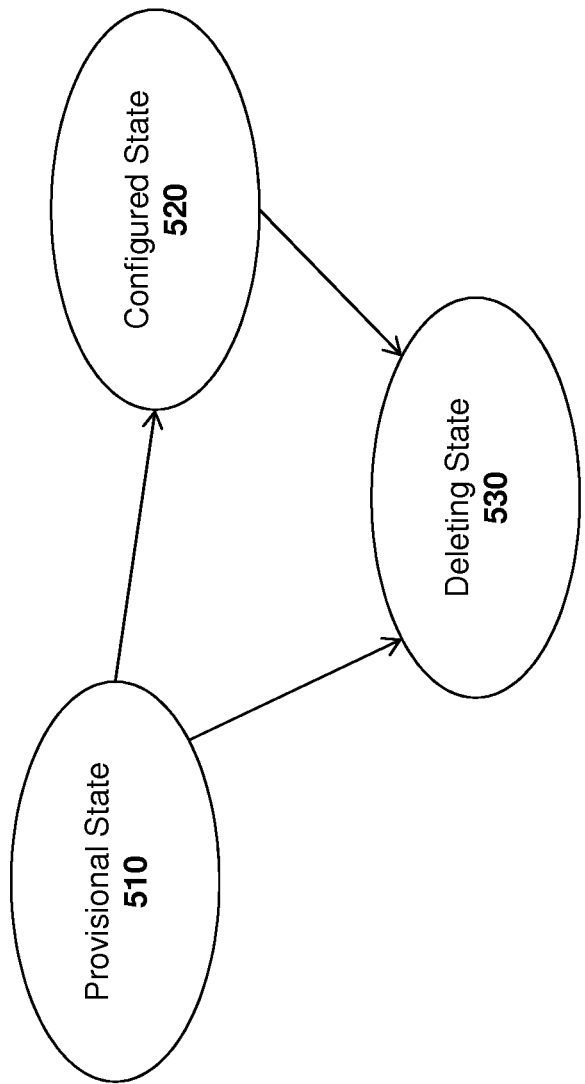
FIG. 5 is a state diagram showing various states for a domain in accordance with one embodiment of the present disclosure.

The domain may be in various states. Reference is made to FIG. 5, which shows a state transition diagram in accordance with the present disclosure. As a domain is being created or deleted, it may transition through intermediate states which may require a platform to perform or continue tasks on behalf of an agent. In particular, in FIG. 5, a first provisional state 510 exists when a domain is being created but not yet fully provisioned. This state allows agents to prevent the use of an incorrectly provisioned domain.

From state 510 the domain may transition to state 520, which is a configured state. In state 520 the domain is active and ready for use.

Once a user or enterprise or managing entity decides that the domain needs to be deleted, the state may transition from state 520 to state 530 which is a "deleting" state. In state 530, the domain is marked for deletions and the only transition from such state is into a completion of deletion. In this case, the platform will complete the deletion process even if the deletion process is interrupted before it was finished.

Further, a transition may exist between state 510 and 530 if a provisional domain is initiated but if the device is rebooted prior to the domain being completely set up.

The interaction between the management agents and other system components for installation or deletion, or to supply the policies and restriction sets, may be done in a number of ways. For example, the management agents on the device may need to use a standard application program interface and provide information in a predefined format.

Alternatively, an abstraction layer could exist between the various management agents and the remainder of the device to translate the information from the management agents into a format expected by the policy manager. Such abstraction layer could be provided based on the type of device and policy manager and could be customized for various third party management agents.

The processes of any of FIGS. 1 to 4 may be stored as program code in any tangible, non-transitory computer readable medium, which when accessed by a processor on the mobile device may cause the processes to be executed.

As will be appreciated by those in the art, the above may be implemented on any computing device. If the above is implemented on a mobile device, one example mobile device is provided with regard to FIG. 6.

Mobile device 600 may be a two-way wireless communication device having voice and data communication capabilities. Depending on the exact functionality provided, the mobile device may be referred to as a data messaging device, a two-way pager, a wireless e-mail device, a cellular telephone with data messaging capabilities, a wireless Internet appliance, a wireless device, a user equipment (UE), or a data communication device, as examples.

Where mobile device 600 is enabled for two-way communication, it may incorporate a communication subsystem 611, including both a receiver 612 and a transmitter 614, as well as associated components such as one or more antenna elements 616 and 618, local oscillators (LOs) 613, and a processing module such as a digital signal processor (DSP) 620. Although not shown, communication subsystem 611 may include additional components. For example, mobile device 600 may comprise multiple receivers 612 and/or transmitters 614 to allow for simultaneous radio activity. In addition, as will be apparent to those skilled in the field of communications, the particular design of the communication subsystem 611 will be dependent upon the communication network in which the device is intended to operate.

Network access requirements will also vary depending upon the type of network 619. In some networks network access is associated with a subscriber or user of mobile device 600. A mobile device may require one or more smart cards which can contain different applications such as a USIM, RUIM or a SIM application in order to operate on a network. The smart card interface 644 is normally similar to a card-slot into which a smart card can be inserted and ejected. The smart card can have memory and hold many key configurations 651, and other information 653 such as identification, and subscriber related information.

Figure 6:
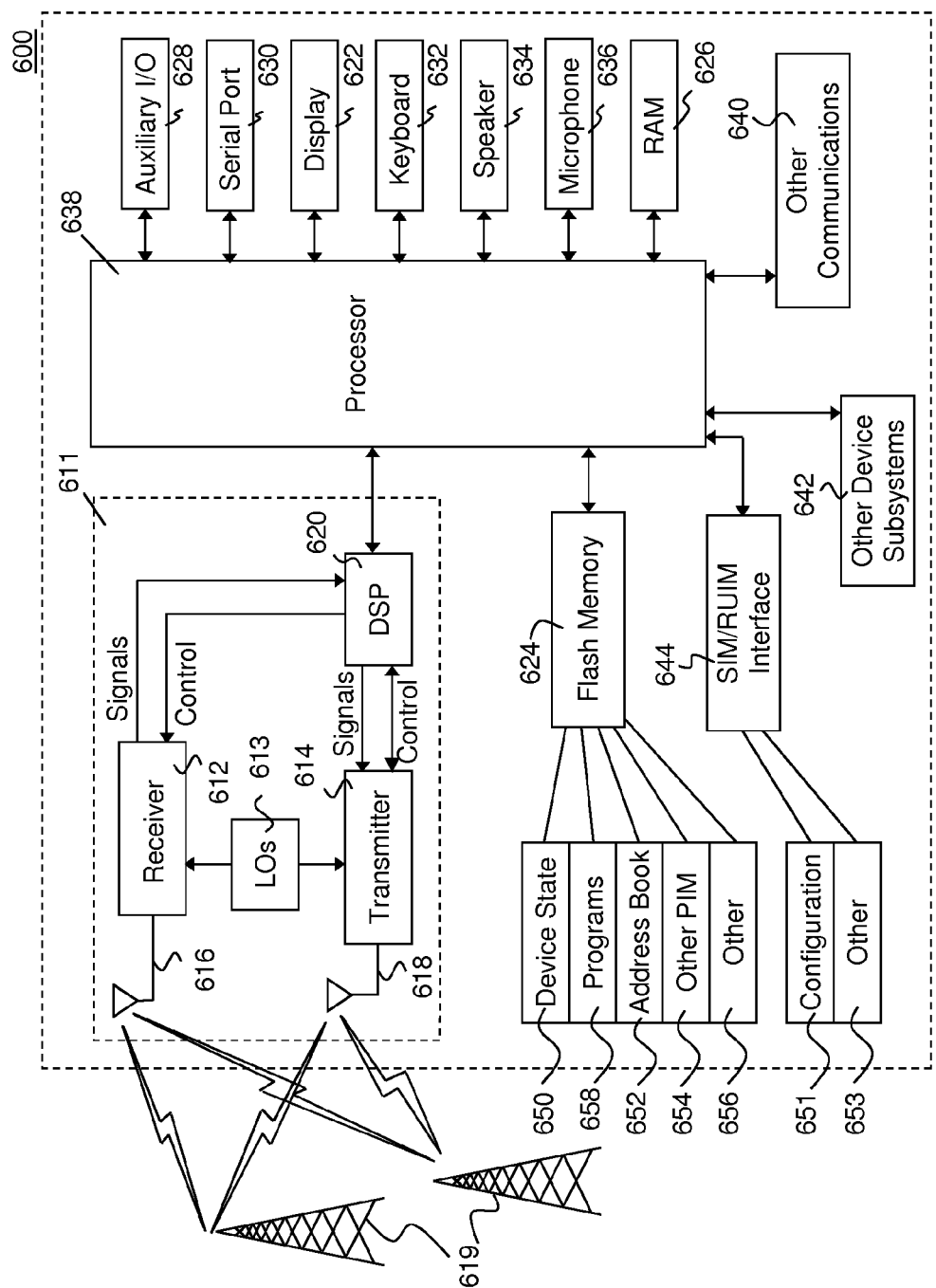
FIG. 6 is a block diagram of an example mobile device capable of implementing the methods of the present disclosure in accordance with one embodiment of the present disclosure.

When required network registration or activation procedures have been completed, mobile device 600 may send and receive communication signals over the network 619. As illustrated in FIG. 6, network 619 can consist of multiple base stations communicating with the mobile device.

Signals received by antenna 616 through communication network 619 are input to receiver 612, which may perform such common receiver functions as signal amplification, frequency down conversion, filtering, channel selection and the like. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

Mobile device 600 generally includes a processor 638 which controls the overall operation of the device. Communication functions, including data and voice communications, are performed through communication subsystem 611. Processor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the processor 638 may be stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Processor 638, in addition to its operating system functions, may enable execution of software applications on the mobile device. A predetermined set of applications that control basic operations, including at least data and voice communication applications for example, will normally be installed on mobile device 600 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 619. Further applications may also be loaded onto the mobile device 600 through the network 619, an auxiliary I/O subsystem 628, serial port 630, short-range communications subsystem 640 or any other suitable subsystem 642, and installed by a user in the RAM 626 or a non-volatile store (not shown) for execution by the processor 638. Such flexibility in application installation increases the functionality of the device and may provide enhanced on-device functions, communication-related functions, or both. For example, secure communication applications may enable electronic commerce functions and other such financial transactions to be performed using the mobile device 600.

In a data communication mode, a received signal such as a text message or web page download will be processed by the communication subsystem 611 and input to the processor 638, which may further process the received signal for output to the display 622, or alternatively to an auxiliary I/O device 628.

A user of mobile device 600 may also compose data items such as email messages for example, using the keyboard 632, which may be a complete alphanumeric keyboard or telephone-type keypad, whether virtual or real, among others, in conjunction with the display 622 and possibly an auxiliary I/O device 628. Such composed items may then be transmitted over a communication network through the communication subsystem 611.

For voice communications, overall operation of mobile device 600 is similar, except that received signals would typically be output to a speaker 634 and signals for transmission would be generated by a microphone 636. Alternative voice or audio I/O subsystems, such as a voice message recording subsystem, may also be implemented on mobile device 600. Although voice or audio signal output is generally accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type mobile device for which synchronization with a user's desktop computer (not shown) may be desirable, but is an optional device component. Such a port 630 would enable a user to set preferences through an external device or software application and would extend the capabilities of mobile device 600 by providing for information or software downloads to mobile device 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, is a further optional component which may provide for communication between mobile device 600 and different systems or devices, which need not necessarily be similar devices. For example, the subsystem 640 may include an infrared device and associated circuits and components or a Bluetooth™ communication module to provide for communication with similarly enabled systems and devices. Subsystem 640 may further include non-cellular communications such as WiFi or WiMAX.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a mobile device for creating a managed domain on the mobile device, the method comprising:
   initializing a container on the mobile device to house the managed domain, said initializing comprising creating the container, the domain comprising a virtualized operating system, and the container comprising a memory area on the device to house the managed domain;
   after said initializing the container, retrieving a management agent for the managed domain;
   installing the management agent into the initialized container and executing the management agent within the initialized container;
   establishing, by the management agent, policies to govern the creation of the managed domain; and
   configuring the initialized container for the domain based on the established policies.

2. The method of claim 1, wherein the initializing only starts to create the container to avoid the container from being untrusted by the management agent.

3. The method of claim 1, wherein the retrieving is from one of: the mobile device; and a remote server.

4. The method claim 1, wherein the retrieving is from a memory location on the mobile device.

5. The method of claim 1, wherein the establishing uses policies of other management agents on the mobile device, as well as policies for the managed domain.

6. The method of claim 5, wherein the policies of the other management agents are ignored if the policies for the management agent for the initialized container only apply to the managed domain.

7. The method of claim 1, further comprising reconfiguring the mobile device based on the policies of the management agent associated with the managed domain.

8. The method of claim 7, wherein the reconfiguring includes at least one of: deleting existing data on the device; removal of existing applications or configurations on the device; and creation or initialization of at rest data storage regions with encryption properties.

9. A mobile device configured for creating a managed domain on the mobile device, the mobile device comprising:
   a processor; and
   memory,
   wherein the mobile device is configured to:
   initialize a container on the mobile device to house the managed domain, said initializing comprising creating the container, the domain comprising a virtualized operating system, and the container comprising a memory area on the device to house the managed domain;
   after the container is initialized, retrieve a management agent for the managed domain;
   install the management agent into the initialized container and execute the management agent within the initialized container;
   establish, by the management agent, policies to govern the creation of the managed domain; and
   configure the initialized container for the domain based on the established policies.

10. The mobile device of claim 9, wherein the mobile device is configured to initialize by only starting to create the container to avoid the container from being untrusted by the management agent.

11. The mobile device of claim 9, wherein the mobile device is configured to retrieve the management agent from one of: the mobile device; and a remote server.

12. The mobile device of claim 9, wherein the mobile device is configured to retrieve the management agent from a memory location on the mobile device.

13. The mobile device of claim 9, wherein the mobile device is configured establish using policies of other management agents on the mobile device, as well as policies for the managed domain.

14. The mobile device of claim 13, wherein the policies of the other management agents are ignored if the policies for the management agent for the initialized container only apply to the managed domain.

15. The mobile device of claim 9, wherein the mobile device is further configured to reconfigure the mobile device based on the policies of the management agent associated with the managed domain.

16. The mobile device of claim 15, wherein the mobile device is configured to reconfigure by at least one of: deleting existing data on the device; removal of existing applications or configurations on the device; and creation or initialization of at rest data storage regions with encryption properties.

* * * * *